United States Patent
Flohr et al.

(10) Patent No.: US 7,320,222 B2
(45) Date of Patent: Jan. 22, 2008

(54) BURNER, METHOD FOR OPERATING A BURNER AND GAS TURBINE

(75) Inventors: Patrick Flohr, Winter Springs, FL (US); Werner Krebs, Mülheim (DE); Günther Schulze, Seukendorf (DE)

(73) Assignee: Siemens Aktiengesellschaft, Munich (DE)

( * ) Notice: Subject to any disclaimer, the term of this patent is extended or adjusted under 35 U.S.C. 154(b) by 54 days.

(21) Appl. No.: 10/506,122

(22) PCT Filed: Feb. 28, 2003

(86) PCT No.: PCT/EP03/02079

§ 371 (c)(1),
(2), (4) Date: Aug. 31, 2004

(87) PCT Pub. No.: WO03/074937

PCT Pub. Date: Sep. 12, 2003

(65) Prior Publication Data

US 2005/0106519 A1  May 19, 2005

(30) Foreign Application Priority Data

Mar. 7, 2002  (EP) .................................. 02005136

(51) Int. Cl.
*F02C 7/045* (2006.01)
*F23R 3/14* (2006.01)
*F23D 1/00* (2006.01)

(52) U.S. Cl. ........................... 60/725; 60/737; 60/748; 431/114

(58) Field of Classification Search ................ 60/725, 60/737, 748; 431/114, 183
See application file for complete search history.

(56) References Cited

U.S. PATENT DOCUMENTS

| 3,819,009 | A | * | 6/1974 | Motsinger | 181/292 |
| 4,589,260 | A | * | 5/1986 | Krockow | 60/737 |
| 5,644,918 | A | * | 7/1997 | Gulati et al. | 60/725 |
| 5,660,045 | A | * | 8/1997 | Ito et al. | 60/737 |
| 6,019,596 | A | * | 2/2000 | Knopfel et al. | 60/737 |
| 6,058,709 | A |   | 5/2000 | Richards et al. | |
| 6,305,927 | B1 | * | 10/2001 | Keller | 60/725 |
| 6,351,947 | B1 | * | 3/2002 | Keller et al. | 60/725 |
| 6,370,879 | B1 | * | 4/2002 | Stalder et al. | 60/725 |
| 6,374,593 | B1 | * | 4/2002 | Ziegner | 60/772 |
| 6,632,084 | B2 | * | 10/2003 | Berenbrink | 431/284 |
| 6,981,358 | B2 | * | 1/2006 | Bellucci et al. | 60/725 |

FOREIGN PATENT DOCUMENTS

| DE | 33 29 937 A1 | | 3/1984 |
| DE | 19839085 A1 | * | 3/2000 |
| EP | 0 597 138 A1 | | 5/1994 |
| EP | 1 004 823 A2 | | 5/2000 |
| WO | WO 93/10401 | | 5/1993 |
| WO | WO 99/49264 | | 9/1999 |

* cited by examiner

*Primary Examiner*—Ted Kim

(57) ABSTRACT

This invention relates to a burner, especially a gas turbine burner, wherein a Helmholtz resonator downstream of a fuel inlet position in directly linked with a burner channel. In this manner, combustion oscillations do not arrive at the fuel inlet position, thereby reducing acoustic disturbances and air ration deviations which are the main cause for the formation of combined oscillations. The invention also relates to a method for operating a burner and a gas turbine.

20 Claims, 2 Drawing Sheets

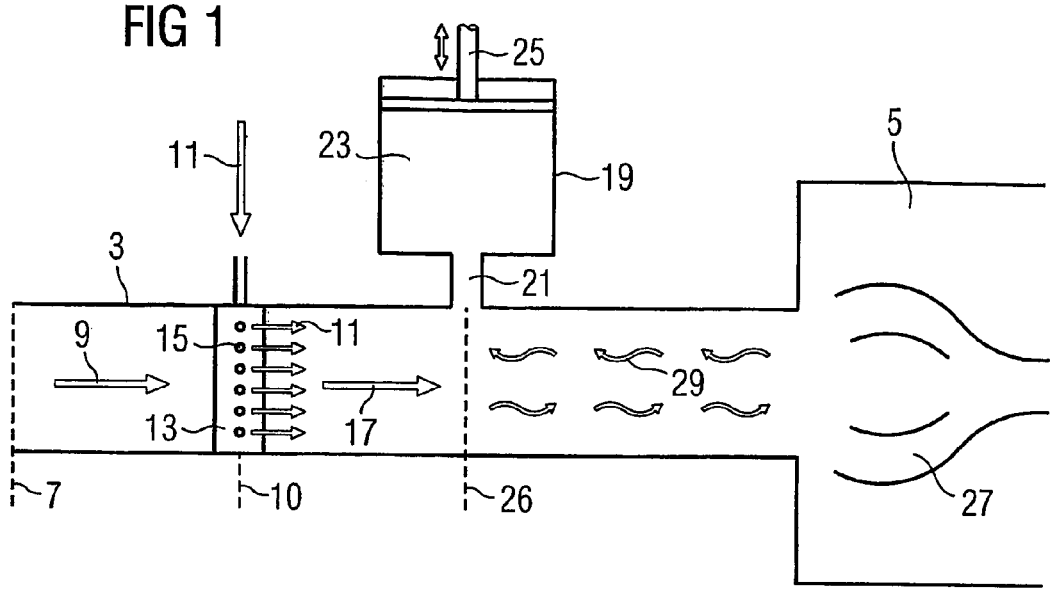
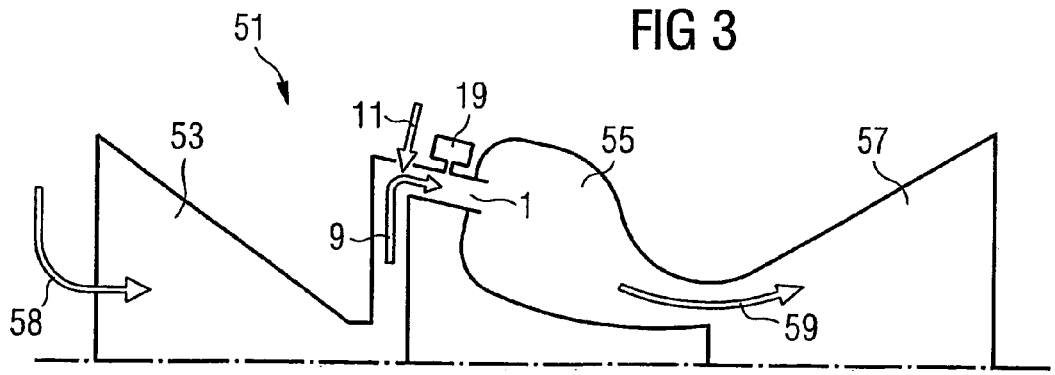
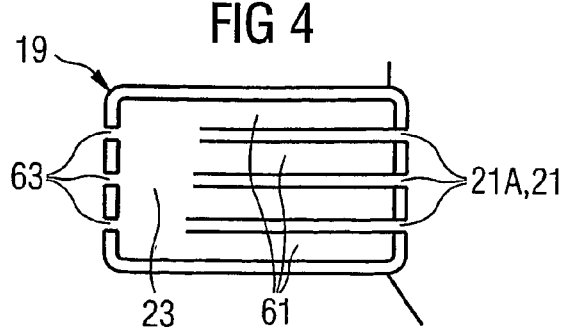

BURNER, METHOD FOR OPERATING A BURNER AND GAS TURBINE

CROSS REFERENCE TO RELATED APPLICATION

This application is the U.S. National Stage of International Application No. PCT/EP03/02079, filed Feb. 28, 2003 and claims the benefit thereof. The International Application claims the benefits of European Patent application No. 02005136.3 EP filed Mar. 7, 2002, both of the applications are incorporated by reference herein in their entirety.

FIELD OF THE INVENTION

The invention relates to a combustor having a combustor channel into which combustion air can be introduced at an air inlet position and fuel can be introduced at a fuel inlet position, wherein the fuel inlet position is located downstream of the air inlet position, and wherein the combustion air and the fuel can be mixed in the combustor channel and then discharged into a combustion zone. The invention also relates to a method for operating such a combustor and a gas turbine, in particular a gas turbine which has an annular combustion chamber.

BACKGROUND OF THE INVENTION

In combustion systems such as gas turbines, aircraft engines, rocket motors and heating systems, thermoacoustically induced combustion oscillations can occur. These are caused by an interaction of the combustion flame and the associated heat release with acoustic pressure fluctuations. As a result of an acoustic stimulation, the location of the flame, the flame front surface or the mixture composition can fluctuate, thereby causing fluctuations in the heat release. In the case of constructive phase positions, positive feedback and amplification can occur. Such an amplified combustion oscillation can result in significant noise exposure and damage due to vibrations.

These thermoacoustically induced instabilities are greatly influenced by the acoustic properties of the combustion chamber and the marginal conditions which are present at the combustion chamber entrance and combustion chamber exit and at the combustion chamber walls. The acoustic properties can be changed by installing Helmholtz resonators.

WO 93/10401 A1 shows a device for suppressing combustion oscillations in a combustion chamber of a gas turbine installation. A Helmholtz resonator is connected to the flow of a fuel feed line. The acoustic properties of the feed line or of the acoustic overall system are thereby changed in such a way that combustion oscillations are suppressed. However, it is also apparent that this measure is not sufficient in all operating states, since combustion oscillations can still occur when oscillations in the fuel line are suppressed.

U.S. Pat. No. 6,058,709 proposes the introduction of fuel at axially differing positions in the combustion channel of a combustor, in order to avoid combustion oscillations. Consequently, with regard to the development of combustion oscillations, constructive phase positions in the mixture composition are superimposed by destructive phase positions, thereby achieving lower fluctuations overall and therefore a decreased tendency to develop combustion oscillations. In terms of equipment, however, this measure is relatively expensive in comparison with the purely passive measure of using Helmholtz resonators.

EP 0 597 138 A1 describes a gas turbine combustion chamber which features air-flushed Helmholtz resonators in the area of the combustors. Vibrational energy from combustion oscillations which occur in the combustion chamber is absorbed by these resonators, and the combustion oscillations are consequently attenuated.

A further measure for attenuating combustion oscillations is shown in EP 1 004 823 A2. In this case, a Helmholtz resonator is connected directly to the mixing area of the combustor. It is emphasized and explicitly disclosed that the resonator must be attached upstream of the fuel feed, since combustion oscillations deriving from the resonator in the combustor and also combustion oscillations which are caused by the feed lines are to be absorbed.

The invention addresses the problem of specifying a combustor which has a particularly low tendency to develop combustion oscillations. The invention further addresses the problem of specifying a method for operating a combustor, which method efficiently prevents combustion oscillations. Lastly, the invention addresses the problem of specifying a gas turbine which has a particularly low tendency to develop combustion oscillations.

SUMMARY OF THE INVENTION

In accordance with the invention, the problem concerning a combustor is solved by specifying a combustor having a combustor channel into which combustion air can be introduced at an air inlet position and fuel can be introduced at a fuel inlet position, wherein the fuel inlet position is located downstream of the air inlet position, wherein the combustion air and the fuel can be mixed in the combustor channel and then discharged into a combustion zone, and wherein a Helmholtz resonator is directly connected to the flow of the combustor channel at a resonator position which is downstream of the fuel inlet position and upstream of the combustion zone, such that a link between air ratio fluctuations and combustion oscillations is largely broken down.

The air ratio is a well-known variable in combustion technology and designates proportionally the mixture composition of the mixture of combustion air and fuel on the basis of the relationship between the concentrations.

The invention demonstrates, for the first time, a means not only for attenuating a combustion oscillation by means of a Helmholtz resonator, but also for preventing a significant reason for the occurrence of the combustion oscillation: namely the fluctuations in the air ratio. As a result of the temporally inhomogeneous heat release, the air ratio fluctuation causes acoustic pulses which can cause a feedback and the formation of a combustion oscillation in the manner described above. Because the Helmholtz resonator is now arranged downstream of the fuel inlet, acoustic disturbances at the fuel inlet position and therefore air ratio fluctuations are reduced. In addition to the mere absorption of vibrational energy, the Helmholtz resonator at this resonator position is therefore already capable of preventing the occurrence of the combustion oscillation. A much more efficient means for countering combustion oscillations is achieved thereby.

The combustor channel preferably has the form of an annular channel surrounding a central channel via which, separately from the annular channel, fuel and combustion air can be supplied to the combustion zone, wherein the Helmholtz resonator likewise surrounds the annular channel annularly.

As a result, the resonator can act fully and symmetrically on the annular channel. Uneven temperature distributions are therefore avoided. Due to the position downstream of the fuel inlet, the resonator can also act directly on the location of the greatest heat release, thereby rendering the resonator particularly effective.

In particular, the combustor can be a combined diffusion combustor and premix combustor. In this case, fuel is intimately mixed with combustion air in the annular channel as a premix channel. The central channel is designed as a diffusion combustor in which air and fuel are mixed essentially for the first time in the combustion zone. A premix combustor can burn a small amount of fuel in a large amount of air by virtue of a so-called lean combustion, and therefore exhibits low nitrogen oxide emissions. The lean combustion is often unstable, however, and increasingly tends to form combustion oscillations. The annular Helmholtz resonator counters this. The diffusion combustor burns a richer mixture and stabilizes the premix combustion if required, albeit at the cost of increased nitrogen oxide emissions.

The combustor channel can also be designed as a central channel and be surrounded by an annular channel via which, separately from the central channel, fuel and combustion air can be supplied to the combustion zone, wherein the Helmholtz resonator surrounds the central channel annularly.

In a particularly preferred configuration, Helmholtz resonators can be arranged downstream of the fuel inlet in the case of both the annular channel and the central channel.

Twisted blades are preferably arranged upstream of the resonator position in the combustor channel. Such twisted blades generate a twist which stabilizes the combustion. It is also preferable if the fuel can be introduced via the twisted blades.

Combustion oscillations can preferably be absorbed or reflected by the Helmholtz resonator. While conventional resonators act exclusively by means of absorption, a reflecting effect of the Helmholtz resonator can also reduce combustion oscillations according to the idea of the invention, since a reflection results in a reduction in acoustic disturbances at the fuel inlet and therefore results in the reduction in air ratio fluctuations, as described above.

The Helmholtz resonator preferably has an adjustable volume. This makes it possible to adjust the acoustic properties and therefore acoustically balance the overall system. It is also conceivable to adjust the pressure, e.g. of air, in the resonator volume, wherein said pressure likewise changes the acoustic properties and could even be adjusted during operation.

The Helmholtz resonator preferably has a resonator volume and is connected to the combustor channel via a resonator port, wherein the resonator port extends into the resonator volume by means of a small tube. Furthermore, a plurality of small tubes preferably project into the resonator volume. The internal volume of the resonator is hardly changed in this case. The external dimensions of the resonator can therefore be kept small. The small tubes can be designed such that they are twisted in this case, thus ensuring adequate distance relative to the walls. By changing the length of the small tubes, the attenuation apparatus can be adjusted to various frequencies which occur in the combustion system. In this case, it is not necessary to change the external dimensions of the resonator, and hence of the combustion insert, or the open overall cross-sectional area. The main advantage: in order to attenuate low frequencies, it is possible to forgo an increase in the volume of the resonator by virtue of the inwardly projecting small tubes.

The combustor is preferably designed as a gas turbine combustor.

In accordance with the invention, the problem concerning a gas turbine is solved by specifying a gas turbine having a combustor as per one of the embodiments described above.

The advantages of such a gas turbine correspond to the advantages as described for the claimed combustor. Combustion oscillations in a gas turbine are particularly disturbing and damaging due to the high power densities. Furthermore, the gas turbine preferably has an annular combustion chamber. Serious combustion oscillations can easily occur in an annular combustion chamber due to the large coupled combustion space.

In accordance with the invention, the problem concerning a method is solved by specifying a method for operating a combustor having a combustor channel into which combustion air is introduced at an air inlet position and fuel is introduced at a fuel inlet position, wherein the fuel inlet position is located downstream of the air inlet position, wherein the combustion air is mixed with the fuel in the combustor channel and then discharged into a combustion zone, and wherein a link between air ratio fluctuations and combustion oscillations is largely broken down by virtue of a Helmholtz resonator being directly connected to the flow of the combustor channel at a resonator position which is downstream of the fuel inlet position and upstream of the combustion zone, such that combustion oscillations do not penetrate as far as the fuel inlet position.

The advantages of such a method correspond to the above explanations of the advantages of the combustor.

BRIEF DESCRIPTION OF THE DRAWINGS

By way of example, and to some extent schematically, the invention is explained with reference to the drawing in which:

FIG. 1 shows a method for reducing combustion oscillations,

FIG. 3 shows a gas turbine, and

FIG. 4 shows a Helmholtz resonator.

DETAILED DESCRIPTION OF THE INVENTION

Figure 2:
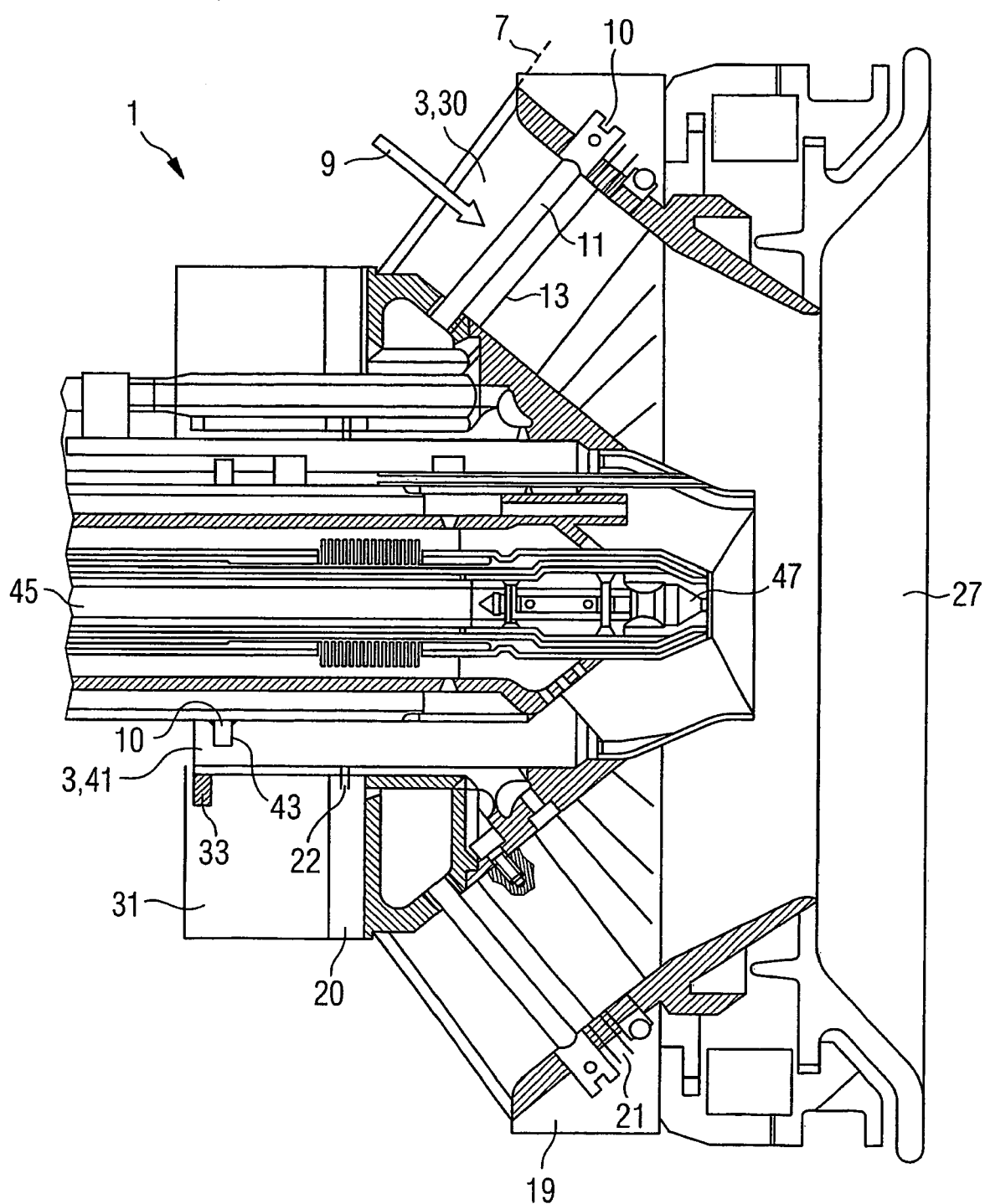
FIG. 2 shows a gas turbine combustor.

Identical reference signs have the same meaning in the different figures.

FIG. 1 schematically shows a combustor 1 and a method for operating the combustor 1. The combustor 1 has a combustor channel 3. The combustor channel 3 flows into a combustion chamber 5. Combustion air 9 is introduced into the combustor channel 3 at an air inlet position 7. Fuel 11, in particular natural gas, is introduced into the combustor channel 3 at a fuel inlet position 10 which is located downstream of the air inlet position 7. This occurs via outlet openings 15 in twisted blades 13, which are arranged in the combustor channel 3 and produce a stabilization of the combustion by generating a backflow area. The resulting mixture 17 of combustion air 9 and fuel 11 is then burned in the combustion chamber 5.

A Helmholtz resonator 19 is directly connected via a resonator port 21 to the flow of the combustor channel 3 at a resonator position 26. The Helmholtz resonator 19 has a resonator volume 23. The resonator volume 23 can be adjusted via a piston 25.

During the combustion in a combustion zone 27 in the combustion chamber 5, uneven heat release can result in acoustic pulses which can also in turn cause an uneven heat release following reflection at the surrounding walls. With the right phase superimposition, this can result in the formation of a combustion oscillation 29 which also penetrates into the combustor channel 3. One important reason for the occurrence of the uneven heat release is air ratio fluctuations, which can be caused by acoustic disturbances in the vicinity of the fuel inlet position 10. The Helmholtz resonator 19 changes the acoustic properties of the combustor channel 3 at the resonator position 26 in such a way that a combustion oscillation 29 does not penetrate as far as the fuel inlet position 10. This achieves a separation of air ratio fluctuations at the fuel inlet position 10 and combustion oscillations 29. For the first time, therefore, a cause of the occurrence of a combustion oscillation 29 is counteracted by a Helmholtz resonator 19 and, not solely by absorption, the amplitude of such combustion oscillations 29 is attenuated.

FIG. 2 illustrates a gas turbine combustor 1. The combustor channel 3 surrounds a central channel 41 as an annular channel 30. The annular channel 30 is designed as a premixing channel, in which fuel 11 and combustion air 9 are intensively mixed prior to the combustion. This is called premix combustion. The fuel 11 is fed into the annular channel 30 via hollow twisted blades 13. The central channel 41 leads into the combustion zone 27, together with a central fuel lance 45 which supplies fuel 47, in particular oil, via a swirl nozzle 47. In this case, fuel 11 and combustion air 9 are mixed for the first time in the combustion zone 27, and this is known as diffusion burning. However, it is also possible to add fuel 11, in particular natural gas, into the central channel 41 upstream of the combustion zone 27 via a fuel inlet 43.

The annular channel 30 is surrounded annularly by a Helmholtz resonator 19, which is directly connected to the flow of the annular channel 30 via resonator ports 21 which are designed in the form of holes. Also in the case of the central channel 41, a Helmholtz resonator 20 is directly connected to the flow of the central channel 41 via resonator ports 22 which are designed in the form of holes. In both cases, the relevant Helmholtz resonator 19,20 is arranged downstream of the relevant fuel inlet position 10, having the effect described above. In order further to attenuate combustion oscillations 29, a supplementary resonator 31 is directly connected to the flow of the central channel 41 via a resonator port 33 which has the form of a slot.

A gas turbine 51 is depicted in FIG. 3. The gas turbine 51 has a compressor 53, an annular combustion chamber 55 and a turbine part 57. Air 58 from the environment is supplied to the compressor 53 and is greatly compressed there to form combustion air 9. The combustion air 9 is then supplied to the annular combustion chamber 55. There it is combusted with fuel 11, by means of gas turbine combustors 1 of the aforementioned type, to form a hot gas 59. The hot gas 59 drives the turbine part 57.

FIG. 4 shows a Helmholtz resonator 19 having a resonator volume 23 and a resonator port 21 which consists of a plurality of holes 21A. Each of the holes 21A extends into the resonator volume 23 via a small tube 61 in each case. The small tubes 61 therefore project into the resonator volume 23. The internal volume of the resonator is hardly changed in this case. The external dimensions of the resonator 19 can therefore be kept small. The small tubes 61 can be designed such that they are twisted in this case, thus ensuring adequate distance relative to the walls. By changing the length of the small tubes 61, the attenuation apparatus can be adjusted to any desired frequency which occurs in the combustion system. In this case, it is not necessary to change the external dimensions of the resonator 19, and hence of the combustion insert, or the open overall cross-sectional area. The main advantage: in order to attenuate low frequencies, it is possible to forgo an increase in the volume of the resonator 19 by virtue of the inwardly projecting small tubes 61. The resonator 19 is air-flushed via air inlets 63. This allows a cooling of the resonator 19 on the one hand, and allows the impedance of the resonator 19 to be adjusted via the air flow quantity on the other hand.

The invention claimed is:

1. A gas turbine combustor, comprising:
   a combustor channel;
   an air inlet position adapted to provide combustion air;
   a fuel inlet position adapted to provide fuel;
   a mixing region fluidly coupled with the air inlet position and the fuel inlet position, and adapted to allow mixing of the fuel and combustion air; and
   a first Helmholtz resonator located within the combustor channel at a resonator position and comprising resonator ports, not supplying fuel, located downstream of the mixing region and sized and configured to decouple the air ratio fluctuations and combustion oscillations.

2. The gas turbine combustor as claimed in claim 1, wherein the combustor channel is an annular channel that surrounds a central channel such that the fuel and combustion air is supplied to a combustion zone separately from the annular channel and the first Helmholtz resonator surrounds the annular channel.

3. The gas turbine combustor as claimed in claim 1, wherein the combustor channel is a central channel that is surrounded by an annular channel such that the fuel and combustion air is supplied to a combustion zone separately from the central channel and the first Helmholtz resonator surrounds the central channel annularly.

4. The gas turbine combustor as claimed in claim 3, wherein the annular channel is connected to a second Helmholtz resonator that surrounds the annular channel annularly, said connection being downstream of the fuel inlet position.

5. A gas turbine comprising the gas turbine combustor of claim 3.

6. The gas turbine combustor as claimed in claim 1, wherein a plurality twisted blades are arranged upstream of the first resonator in the combustor channel.

7. The gas turbine combustor as claimed in claim 6, wherein the fuel is introduced via the twisted blades.

8. The gas turbine combustor as claimed in claim 1, wherein the combustion oscillations are absorbed by the first Helmholtz resonator.

9. The gas turbine combustor as claimed in claim 1, wherein the combustion oscillations are reflected by the first Helmholtz resonator.

10. The gas turbine combustor as claimed in claim 1, wherein the Helmholtz resonator further comprises an adjustable resonator volume.

11. The gas turbine combustor as claimed in claim 10, wherein the Helmholtz resonator is connected to the combustor channel via a resonator port and the resonator port extends into the resonator volume by means of a small tube.

12. A gas turbine combustor, comprising:
   a combustor channel;
   an air inlet position adapted to provide combustion air;
   a fuel inlet position adapted to provide fuel;
   a first mixing region fluidly coupled with the air inlet position and the fuel inlet position, and adapted to allow mixing of the fuel and combustion air; and a first Helmholtz resonator located within the combustor channel at a resonator position and comprising resonator ports, not supplying fuel, located downstream of the first mixing region and sized and configured to change the acoustic properties in such a way that a combustion oscillation does not penetrate as far as the fuel inlet position;

wherein the combustor channel comprises an annular channel surrounding a central channel, and the first Helmholtz resonator surrounds the central channel annularly.

13. The gas turbine combustor as claimed in claim 12, wherein the annular channel is connected to a second Helmholtz resonator that surrounds the annular channel annularly and comprising resonator ports, not supplying fuel, located downstream of a second mixing region that is downstream of air inlet and fuel inlet positions in the annular channel, and sized and configured to change the acoustic properties in such a way that a combustion oscillation does not penetrate as far as the respective fuel inlet position.

14. The gas turbine combustor as claimed in claim 13, wherein a plurality twisted blades are arranged upstream of the second Helmholtz resonator in the combustor channel.

15. The gas turbine combustor as claimed in claim 14, wherein the fuel is introduced via the twisted blades.

16. The gas turbine combustor as claimed in claim 13, wherein the combustion oscillations are absorbed by the Helmholtz resonators.

17. The gas turbine combustor as claimed in claim 13, wherein the combustion oscillations are reflected by the Helmholtz resonators.

18. The gas turbine combustor as claimed in claim 13, wherein the central channel comprises a central fuel lance terminating in a swirl nozzle.

19. A gas turbine comprising the gas turbine combustor of claim 13.

20. A gas turbine comprising the gas turbine combustor of claim 12.

* * * * *